United States Patent
Moon et al.

(10) Patent No.: US 11,318,870 B2
(45) Date of Patent: May 3, 2022

(54) SEAT BACK FRAME FOR VEHICLE AND MANUFACTURING METHOD THEREOF

(71) Applicant: LG Hausys, Ltd., Seoul (KR)

(72) Inventors: Hyoung-Jun Moon, Seoul (KR); Sang-Hyeon Park, Seoul (KR); Yong-Kil Kil, Seoul (KR); Dong-Gwan Kim, Seoul (KR); Yong-Han Kang, Seoul (KR); Hee-June Kim, Seoul (KR); Eun-Guk Lee, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 16/764,877

(22) PCT Filed: Nov. 16, 2018

(86) PCT No.: PCT/KR2018/014083
§ 371 (c)(1),
(2) Date: May 17, 2020

(87) PCT Pub. No.: WO2019/098743
PCT Pub. Date: May 23, 2019

(65) Prior Publication Data
US 2020/0324673 A1    Oct. 15, 2020

(30) Foreign Application Priority Data
Nov. 16, 2017  (KR) .................. 10-2017-0152736

(51) Int. Cl.
*B60N 2/68*     (2006.01)
*B60N 2/58*     (2006.01)
*B29K 101/12*   (2006.01)

(52) U.S. Cl.
CPC ............... *B60N 2/682* (2013.01); *B60N 2/58* (2013.01); *B29K 2101/12* (2013.01);
(Continued)

(58) Field of Classification Search
CPC ................................ B60N 2/68; B60N 2/686
See application file for complete search history.

(56) References Cited

U.S. PATENT DOCUMENTS 4,123,105 A * 10/1978 Frey .................. A47C 5/12
                                                   297/451.1
7,128,373 B2 * 10/2006 Kurtycz ............. B60N 2/686
                                                  297/452.15
(Continued)

FOREIGN PATENT DOCUMENTS

CN    102046416 A    5/2011
CN    105073491 A    11/2015
(Continued)

OTHER PUBLICATIONS

International Search Report dated Mar. 20, 2019 for corresponding international application No. PCT/KR2018/014083.
(Continued)

*Primary Examiner* — Timothy J Brindley
(74) *Attorney, Agent, or Firm* — Hauptman Ham, LLP

(57) ABSTRACT

A seat back frame for a vehicle according to an embodiment of the present invention comprises: a frame body consisting of a thermoplastic fiber reinforced composite material; a reinforcing agent joined to the inside of the frame body; and a cover sheet joined to the outside of the frame body. According to the present invention, the frame is lightweight while maintaining rigidity and strength like a steel frame, and a cover sheet is joined thereto, thereby enabling a board which is further joined to the seat back frame to be omitted, which leads to the achievement of a slimmed and fabric-integrated seat back frame for a vehicle. Also, a cover sheet is joined to a body frame by using a vacuum adsorption scheme, which leads to the achievement of a method for
(Continued)

manufacturing a seat back frame for a vehicle having improved joining force and increased merchantability.

9 Claims, 4 Drawing Sheets

(52) U.S. Cl.
CPC ........ *B60N 2/686* (2013.01); *B60N 2002/684* (2013.01); *B60N 2205/35* (2013.01)

(56) References Cited

U.S. PATENT DOCUMENTS

| | | | |
|---|---|---|---|
| 7,377,586 B2* | 5/2008 | Evans | B60N 2/3013 |
| | | | 297/248 |
| 8,511,748 B2* | 8/2013 | McLeod | B60N 2/686 |
| | | | 297/216.1 |
| 9,487,118 B2* | 11/2016 | Matsumoto | B29C 45/14786 |
| 9,724,858 B2* | 8/2017 | Ribaric | B29C 45/0003 |
| 10,053,151 B2* | 8/2018 | Murata | B62D 21/11 |
| 10,493,885 B2* | 12/2019 | Okuma | B60N 2/686 |
| 2005/0040690 A1 | 2/2005 | Kurtycz et al. | |
| 2013/0069415 A1* | 3/2013 | Yasuda | B60N 2/686 |
| | | | 297/452.18 |
| 2014/0284987 A1* | 9/2014 | Yasuda | B60N 2/686 |
| | | | 297/452.18 |
| 2015/0210194 A1* | 7/2015 | Furuta | B60N 2/7094 |
| | | | 297/391 |
| 2016/0221485 A1* | 8/2016 | Harris | B32B 7/12 |
| 2018/0326630 A1* | 11/2018 | Lee | B29C 70/20 |
| 2020/0094714 A1* | 3/2020 | Yonehara | B60N 2/4228 |

FOREIGN PATENT DOCUMENTS

| | | | |
|---|---|---|---|
| CN | 106166972 A | | 11/2016 |
| DE | 10 2006 051 566 A1 | | 5/2008 |
| EP | 3 202 618 A1 | | 8/2017 |
| KR | 10-0217510 B1 | | 9/1999 |
| KR | 10-1306296 B1 | | 9/2013 |
| KR | 2015-0144050 A | | 12/2015 |
| KR | 10-1643177 B1 | | 7/2016 |
| KR | 10-1714833 B1 | | 3/2017 |
| KR | 10-1738058 B1 | | 5/2017 |
| WO | WO-2004024424 A1 * | 3/2004 | ........... B29C 70/205 |

OTHER PUBLICATIONS

Korean Notice of Allowance dated Nov. 23, 2020, in connection with corresponding Korean Patent Application No. 10-2017-0152736.

Office Action dated Nov. 22, 2021, for corresponding Chinese patent application No. 201880074501.0, along with an English machine translation.

* cited by examiner

SEAT BACK FRAME FOR VEHICLE AND MANUFACTURING METHOD THEREOF

CROSS-REFERENCE TO RELATED APPLICATION

The present application is a national stage filing under 35 U.S.C § 371 of PCT application number PCT/KR2018/014083 filed on Nov. 16, 2018 which is based upon and claims the benefit of priority to Korean Patent Application No. 10-2017-0152736, filed on Nov. 16, 2017, in the Korean Intellectual Property Office. The disclosures of the above-listed applications are hereby incorporated by reference herein in their entireties.

FIELD

The present disclosure relates to a seatback frame for a vehicle and a manufacturing method thereof. More specifically, the present disclosure relates to a seatback frame for a vehicle in which each of a body frame and a reinforcing member is made of a thermoplastic fiber-reinforced composite material, and a cover sheet is coupled to the body frame, and to a manufacturing method of a seatback frame for a vehicle in which a heated cover sheet is pressurized in a vacuum suctioned state and is coupled to a body frame.

DESCRIPTION OF RELATED ART

In general, a vehicle seat is important in terms of comfort and safety, and appropriately absorbs impact or vibration transmitted during vehicle travel, thereby to provide adequate comfort to a passenger.

Further, while satisfying the above requirement, the vehicle seat should have sufficient rigidity and strength to ensure passenger safety.

Further, a seatback frame is a rigid structure provided inside a seat of a vehicle and is a basic skeleton of a seatback that helps ab user to take a comfortable and stable posture.

Moreover, a seatback frame of a passenger car (simply referred to as 'seatback frame') may be damaged or deformed by a passenger behavior when the vehicle suddenly stops or crashes, thereby causing great damage to the seated passenger.

Accordingly, the seatback frame should satisfy the regulations such as no damage to the seatback caused by inertia due to a weight of the seatback in situations such as vehicle collision and sudden stop, and no permanent deformation or damage of the seatback when pulling or pushing the seatback with a certain force.

A conventional seatback frame is manufactured using a single material such as steel. However, it takes a lot of money to produce a seatback frame using a material such as steel There is a disadvantage in that a weight of the seatback frame increases.

In order to solve these conventional problems, there is a need to develop an improved seatback frame which is structurally rigid and lightweight and has a lowered manufacturing cost compared to the seatback frame made of the steel.

DISCLOSURE

Technical Purposes

One aspect of the present disclosure is to provide a monolithic seatback frame which is light weight while having rigidity and strength as in a steel frame, and a cover sheet is coupled to the frame, such that a board that is additionally coupled to the seatback frame is omitted.

Another aspect of the present disclosure is to provide a method of manufacturing a seatback frame for a vehicle in which a reinforcing member is coupled to a body frame made of a thermoplastic fiber reinforced composite material in an injection molding manner, and a heated cover sheet is pressurized in a vacuum suctioned state and is coupled to the body frame, thereby to improve a coupling force.

Technical Solutions

A seatback frame for a vehicle includes a frame body made of a thermoplastic fiber-reinforced composite material; a reinforcing member coupled to an inner side of the frame body; and a cover sheet coupled to an outer side of the frame body.

In one implementation of the seatback frame, the reinforcing member includes: a first reinforcing part extending across the frame body horizontally; a second reinforcing part disposed on each of both sides of the frame body, wherein the second reinforcing part is connected to the first reinforcing part; a third reinforcing part extending the frame body vertically, wherein the third reinforcing part is connected to the first reinforcing part; and a fourth reinforcing part formed on an outer periphery of the frame body, wherein the fourth reinforcing part is connected to the second reinforcing part and the third reinforcing part.

In one implementation of the seatback frame, the reinforcing member further include a headrest connector connected to the second coupling part, wherein the headrest connector has a hole defined therein for receiving a headrest therein.

In one implementation of the seatback frame, the thermoplastic fiber-reinforced composite material includes a continuous-fiber reinforced thermoplastic resin (CFT) or a composite resin containing a continuous-fiber reinforced thermoplastic resin (CFT).

In one implementation of the seatback frame, the reinforcing member is made of a long-fiber reinforced thermoplastic resin (LFT) or is made of a material containing a long-fiber reinforced thermoplastic resin (LFT).

In one implementation of the seatback frame, the cover sheet is made of a thermo plastic olefin (TP)) material.

A method for manufacturing a seatback frame for a vehicle includes a body frame forming step for forming a body frame made of a thermoplastic fiber-reinforced composite material; a reinforcing member forming step for injection-molding a reinforcing member to an inner side of the body frame; and a cover sheet coupling step for coupling a cover sheet to an outer side of the body frame.

In one implementation of the method, the cover sheet coupling step includes: selectively preheating the cover sheet and the body frame; and pressing the cover sheet against the body frame using an upper die while the body frame is seated on a lower die, such that the cover sheet is coupled to the body frame.

In one implementation of the method, the cover sheet coupling step includes: vacuum-suctioning the cover sheet through the lower die while the body frame is seated on the lower die, such that the cover sheet is in close contact with the body frame; and pressing the cover sheet against the body frame using the upper die while the cover sheet is in close contact with the body frame.

In one implementation of the method, a hole is formed in the body frame, and a suction hole corresponding to the hole is formed in the lower die, wherein the cover sheet is vacuum-suctioned through the suction hole.

In one implementation of the method, the thermoplastic fiber-reinforced composite material includes a continuous-fiber reinforced thermoplastic resin (CFT) or a composite resin containing a continuous-fiber reinforced thermoplastic resin (CFT).

In one implementation of the method, the reinforcing member is made of a long-fiber reinforced thermoplastic resin (LFT) or is made of a material containing a long-fiber reinforced thermoplastic resin (LFT).

In one implementation of the method, the cover sheet is made of a thermo plastic olefin (TP)) material.

Specific details of other embodiments are included in the detailed description and drawings.

Technical Effects

According to the present disclosure, a monolithic seatback frame which is light weight while having rigidity and strength as in a steel frame, and a cover sheet is coupled to the frame, such that a board that is additionally coupled to the seatback frame is omitted may be realized. Further, a method of manufacturing a seatback frame for a vehicle in which a reinforcing member is coupled to a body frame made of a thermoplastic fiber reinforced composite material in an injection molding manner, and a heated cover sheet is pressurized in a vacuum suctioned state and is coupled to the body frame, thereby to improve a coupling force may be realized.

It will be fully understood that embodiments of technical ideas according to the present disclosure may provide various effects as not specifically mentioned.

DETAILED DESCRIPTIONS

Advantages and features of the present disclosure, and methods for achieving them will be apparent with reference to embodiments described below in detail together with the accompanying drawings. However, the present disclosure is not limited to the embodiments described herein and may be embodied in other forms. Rather, the embodiments introduced herein are provided to ensure that disclosed contents are thorough and complete and that a spirit of the present disclosure is sufficiently conveyed to those skilled in the art.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a preferred embodiment of the present disclosure will be described in details with reference to the accompanying drawings.

Figure 1:
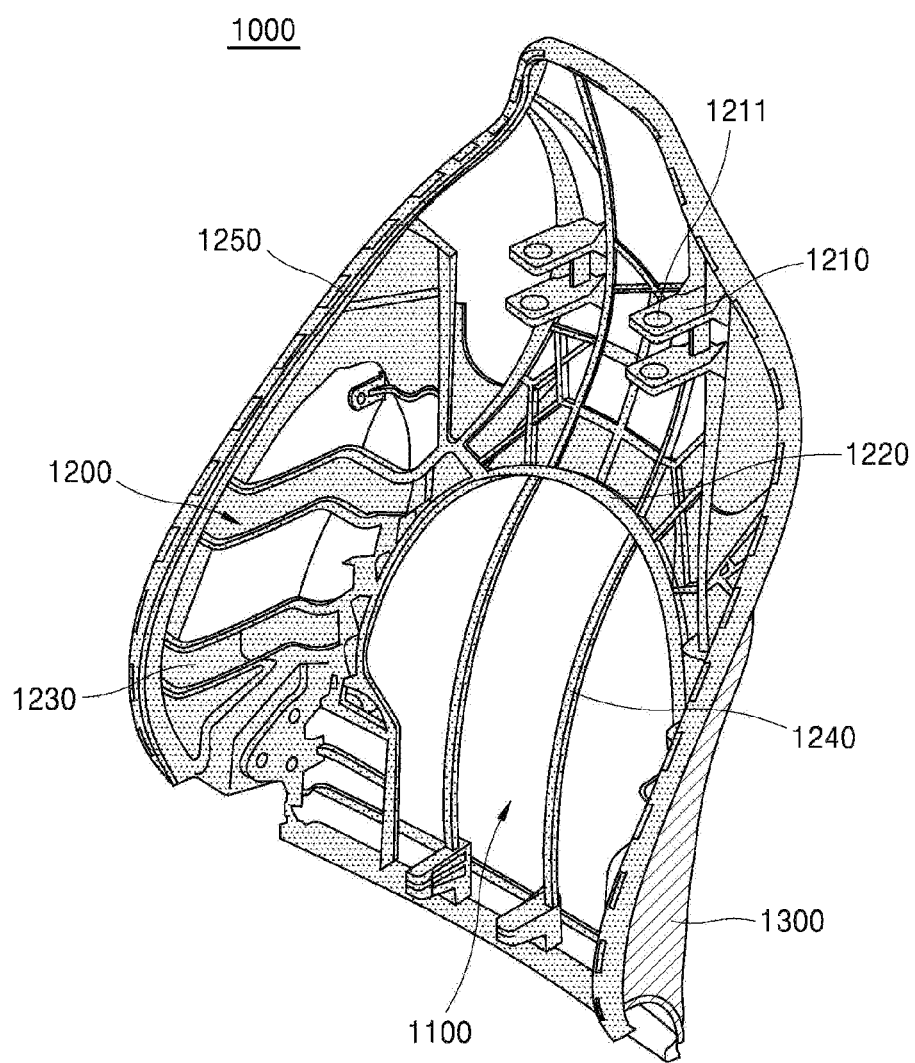
FIG. 1 is a schematic view showing a seatback frame for a vehicle according to an embodiment according to the present disclosure.

FIG. 1 is a schematic view showing a seatback frame for a vehicle according to an embodiment according to the present disclosure.

As shown, a seatback frame 1000 for the vehicle includes a frame body 1100, a reinforcing member 1200 and a cover sheet 1300.

Further, the frame body 1100 may be made of a thermoplastic fiber-reinforced composite material. The thermoplastic fiber-reinforced composite material may include a continuous-fiber reinforced thermoplastic resin (CFT) or a composite resin including a continuous-fiber reinforced thermoplastic resin (CFT).

Further, the reinforcing member 1200 is coupled to the thermoplastic fiber-reinforced composite material in an injection molded manner and thus is coupled to an inside of the frame body 1100.

Moreover, the reinforcing member 1200 is intended to provide rigidity and strength to the frame body 1100. The reinforcing member 1200 may be made of a long-fiber reinforced thermoplastic resin (LFT) or may be made of a material including a long-fiber reinforced thermoplastic resin LFT.

Further, a thermoplastic resin included in the long-fiber reinforced thermoplastic resin LFT may include at least one selected from a group consisting of polypropylene (PP) resin, polyethylene resin, polyamide resin, polyester resin, polyphenylene sulfide resin and combinations thereof.

Moreover, the reinforcing member 1200 includes a headrest connector 1210, a first reinforcing part 1220, a second reinforcing part 1230, a third reinforcing part 1240 and a fourth reinforcing part 1250.

More specifically, the headrest connector 1210 has a hole 1211 receiving a portion of a headrest. Further, the first reinforcing part 1220 is configured to limit bending of the seatback frame 1000 for the vehicle in a transverse direction, and is formed to extend in a transverse direction of the frame body 1100.

Further, the second reinforcing part 1230 is configured to supplement strength of both sides of the seatback frame 1000 for the vehicle, and is located on each of both sides of the frame body 1100. The first reinforcing part 1220 is connected to the second reinforcing part 1230.

Further, the third reinforcing part 1240 is formed to extend in a longitudinal direction of the frame body 1100 and is formed to be connected to the first reinforcing part 1220 and the headrest connector 1210.

Further, the fourth reinforcing part 1250 is configured to supplement strength of an outer circumference of the seatback frame 1000 for the vehicle, and is formed on an outer circumference of the frame body 1100, and is formed as an outer frame. Further, the second reinforcing part 1230 and the third reinforcing part 1240 are connected to the fourth reinforcing part 1250.

Next, the cover sheet 1300 is coupled to an outside of the frame body 1100.

Further, the cover sheet 1300 may be made of a TPO (thermoplastic olefin) material whose pattern is not damaged by heat.

Alternatively, the cover sheet may be formed of a stack structure in which a surface treatment layer, a primer layer, a sheet layer, and a back primer layer are stacked one on top of another.

Alternatively, the cover sheet may be formed of a stack structure in which a surface treatment layer, a primer layer, a sheet layer, and a PP or TPO FOAM layer are stacked one on top of another.

When the cover sheet has the configuration as described above, the cover sheet may have strengthened emboss holding force and has excellent heat-resistance and low temperature characteristics.

Moreover, the cover sheet may include polystyrene-based copolymer and ethylene vinyl acetate-based copolymer. The ethylene vinyl acetate-based copolymer may contain vinyl acetate in a content of 50% by weight or greater.

Moreover, the polystyrene-based copolymer may include at least one selected from a group consisting of SEBS (styrene-(ethylene/buthylene)-styrene BlockCopolymer), CEBC (crystalline block-(ethylene/buthylene)-crystalline block copolymer), HSBR (Hydrogenated styrene butadiene rubber), SBS, SEBC (Styrene-(ethylene/buthylene)-crystalline block copolymer), SEEPS(Polystyrene-block-poly(ethylene-ethylene/propylene)-block polystyrene), SEEPSOH (Polystyrene-block-poly(ethylene-ethylene/propylene)-block-hydroxyl-polystyrene, SEP (Polystyreneblock-poly(ethylene/propylene), and SEPS (Polystyrene-block-poly(ethylene/propylene)-block-polystyrene).

Moreover, a weight-average molecular weight of the polystyrene-based copolymer may be in a range of 50,000 to 300,000.

Moreover, the weight average molecular weight of the ethylene vinyl acetate-based copolymer may be 100,000 to 400,000. Moreover, the polystyrene-based copolymer and the ethylene vinyl acetate-based copolymer may be contained in a weight ratio of 1:9 to 9:1.

Accordingly, the seatback frame 1000 for the vehicle has the reinforcing member 1200 coupled to the inner side of the frame body 1100 and the cover sheet 1300 coupled to the outer side thereof.

Figure 2:
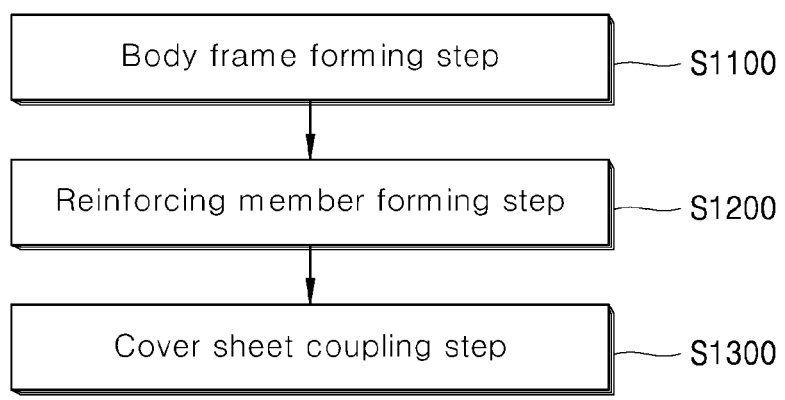
FIG. 2 is a flow chart schematically showing a manufacturing method of the seatback frame for the vehicle shown in FIG. 1.

FIG. 2 is a flow chart schematically showing a manufacturing method of the seatback frame for the vehicle shown in FIG. 1.

As illustrated, a manufacturing method S1000 of the seatback frame for the vehicle includes a body frame forming step S1100, a reinforcing member forming step S1200 and a cover sheet coupling step S1300.

More specifically, the body frame forming step S1100 may include forming the body frame using the thermoplastic fiber-reinforced composite material. The thermoplastic fiber-reinforced composite material may include a continuous-fiber reinforced thermoplastic resin (CFT) or a composite resin including a continuous-fiber reinforced thermoplastic resin (CFT).

Next, the reinforcing member forming step S1200 may include injection-molding the reinforcing part into the body frame.

Further, the reinforcing member 1200 is intended to provide rigidity and strength to the frame body 1100. The reinforcing member 1200 may be made of a long-fiber reinforced thermoplastic resin (LFT) or may be made of a material including a long-fiber reinforced thermoplastic resin LFT.

Further, a thermoplastic resin included in the long-fiber reinforced thermoplastic resin LFT may include at least one selected from a group consisting of polypropylene resin, polyethylene resin, polyamide resin, polyester resin, polyphenylene sulfide resin and combinations thereof.

Moreover, the reinforcing part may be made of two types of materials and may be injection molded to the body frame. Accordingly, various shapes may be realized.

Next, the cover sheet coupling step S1300 may include coupling the cover sheet to the outside of the body frame while the reinforcing part has been coupled to the inside of the body frame.

Further, the cover sheet coupling step S1300 may include a heating step and a pressing step.

That is, the cover sheet and the body frame may be preheated selectively. The heated cover sheet may be pressed onto the outside of the body frame and thus may be coupled to the body frame.

Moreover, when coupling the cover sheet to the body frame, the cover sheet may be coupled to the body frame in a vacuum forming manner to pull the cover sheet toward a mold.

Accordingly, the cover sheet may be more efficiently coupled to the body frame having various bent portions.

Figure 3:
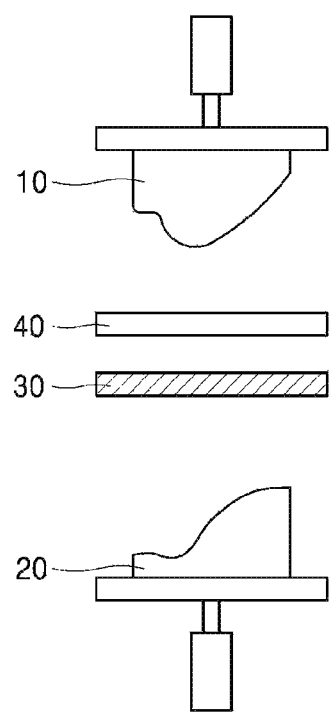
FIG. 3 is a process state diagram schematically showing an embodiment of a cover sheet coupling step shown in FIG. 2.

FIG. 3 is a process state diagram schematically showing an embodiment of the cover sheet coupling step shown in FIG. 2.

As shown in FIG. 3, a cover sheet holder 40 holding the cover sheet is placed between an upper die 10 and a lower die 20 for press forming.

Further, a preheater 30 is interposed between the cover sheet holder 40 and the lower die 20.

Then, the body frame (not shown) having the reinforcing part formed thereon is seated on the lower die 20.

Next, while raising the lower die 20 and lowering the upper die 10, the cover sheet heled by the cover sheet holder 40 is coupled to the body frame.

Figure 4:
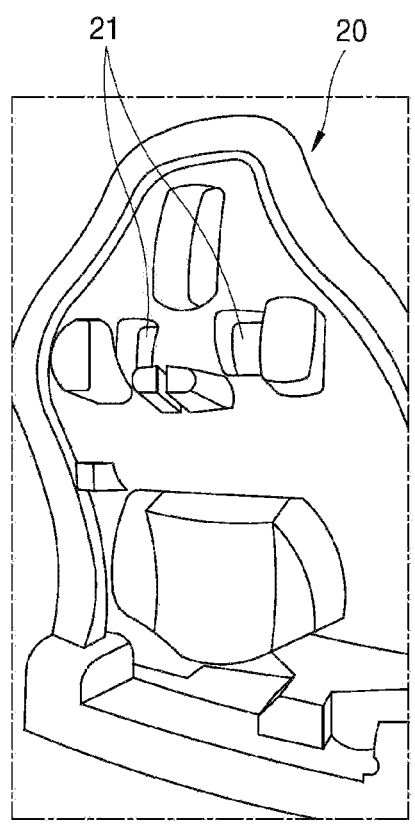
FIG. 4 is a schematic diagram of a lower die shown in FIG. 3.

In this connection, a suction hole 21 is formed in the lower die 20 as shown in FIG. 4, and a hole (not shown) corresponding to the suction hole 21 is formed in the body frame.

Further, the cover sheet is coupled to the body frame by pressing the cover sheet to the body frame while the cover sheet is in close contact with the body frame via suction through the suction hole 21 while the body frame is seated on the lower die 20. Thus, the coupling force is improved.

Further, even when the body frame is formed in a complicated structure, the cover sheet may be coupled to the outer side of the body frame without defective coupling of the cover sheet thereto.

Moreover, FIG. 4 shows an example in which the suction hole is formed in an upper portion. A plurality of suction holes may be formed in a corresponding manner to an edge of the body frame.

The preferred embodiment of the present disclosure has been described above with reference to the accompanying drawings. However, the person having ordinary knowledge in the technical field to which the present disclosure belongs will be understood that the present disclosure may be implemented in other specific forms without changing the technical idea or essential characteristics thereof. Therefore, it should be understood that the embodiments described above are illustrative in all respects and are not limiting.

What is claimed is:

1. A seatback frame for a vehicle, the seatback frame comprising:
    a frame body made of a thermoplastic fiber-reinforced composite material;
    a reinforcing member coupled to an inner side of the frame body; and
    a cover sheet coupled to an outer side of the frame body,
    wherein the reinforcing member includes:
    a first reinforcing part extending across the frame body horizontally;
    a second reinforcing part disposed on each of both sides of the frame body, wherein the second reinforcing part is connected to the first reinforcing part;
    a third reinforcing part extending the frame body vertically, wherein the third reinforcing part is connected to the first reinforcing part; and
    a fourth reinforcing part formed on an outer periphery of the frame body, wherein the fourth reinforcing part is connected to the second reinforcing part and the third reinforcing part,
    wherein the reinforcing member further include a headrest connector connected to the third reinforcing part,
    wherein the headrest connector has a hole defined therein for receiving a headrest therein, and
    wherein the cover sheet is formed of a stack structure in which a surface treatment layer, a primer layer, a sheet layer, and a back primer layer are stacked one on top of another, or wherein the cover sheet is formed of a stack structure in which a surface treatment layer, a primer layer, a sheet layer, and a polypropylene (PP) or a thermoplastic olefin (TPO) foam layer are stacked one on top of another.

2. The seatback frame of claim 1, wherein the thermoplastic fiber-reinforced composite material includes a continuous-fiber reinforced thermoplastic resin (CFT) or a composite resin containing a continuous-fiber reinforced thermoplastic resin (CFT).

3. The seatback frame of claim 1, wherein the reinforcing member is made of a long-fiber reinforced thermoplastic resin (LFT) or is made of a material containing a long-fiber reinforced thermoplastic resin (LFT).

4. A method for manufacturing a seatback frame for a vehicle, the method comprising:
    a body frame forming step for forming a body frame made of a thermoplastic fiber-reinforced composite material;
    a reinforcing member forming step for injection-molding a reinforcing member to an inner side of the body frame; and
    a cover sheet coupling step for coupling a cover sheet to an outer side of the body frame,
    wherein the reinforcing member includes:
    a first reinforcing part extending across the frame body horizontally;
    a second reinforcing part disposed on each of both sides of the frame body, wherein the second reinforcing part is connected to the first reinforcing part;
    a third reinforcing part extending the frame body vertically, wherein the third reinforcing part is connected to the first reinforcing part; and
    a fourth reinforcing part formed on an outer periphery of the frame body, wherein the fourth reinforcing part is connected to the second reinforcing part and the third reinforcing part,
    wherein the reinforcing member further include a headrest connector connected to the third reinforcing part,
    wherein the headrest connector has a hole defined therein for receiving a headrest therein, and
    wherein the cover sheet is formed of a stack structure in which a surface treatment layer, a primer layer, a sheet layer, and a back primer layer are stacked one on top of another, or wherein the cover sheet is formed of a stack structure in which a surface treatment layer, a primer layer, a sheet layer, and a polypropylene (PP) or a thermoplastic olefin (TPO) foam layer are stacked one on top of another.

5. The method of claim 4, wherein the cover sheet coupling step includes:
    selectively preheating the cover sheet and the body frame; and
    pressing the cover sheet against the body frame using an upper die while the body frame is seated on a lower die, such that the cover sheet is coupled to the body frame.

6. The method of claim 5, wherein the cover sheet coupling step includes:
    vacuum-suctioning the cover sheet through the lower die while the body frame is seated on the lower die, such that the cover sheet is in close contact with the body frame; and
    pressing the cover sheet against the body frame using the upper die while the cover sheet is in close contact with the body frame.

7. The method of claim 6, wherein a hole is formed in the body frame, and a suction hole corresponding to the hole is formed in the lower die, wherein the cover sheet is vacuum-suctioned through the suction hole.

8. The method of claim 4, wherein the thermoplastic fiber-reinforced composite material includes a continuous-fiber reinforced thermoplastic resin (CFT) or a composite resin containing a continuous-fiber reinforced thermoplastic resin (CFT).

9. The method of claim 4, wherein the reinforcing member is made of a long-fiber reinforced thermoplastic resin (LFT) or is made of a material containing a long-fiber reinforced thermoplastic resin (LFT).

* * * * *